I. E. HINDMAN.
FRICTION CLUTCH DEVICE.
APPLICATION FILED MAY 7, 1912.
1,089,703.
Patented Mar. 10, 1914.
2 SHEETS—SHEET 2.
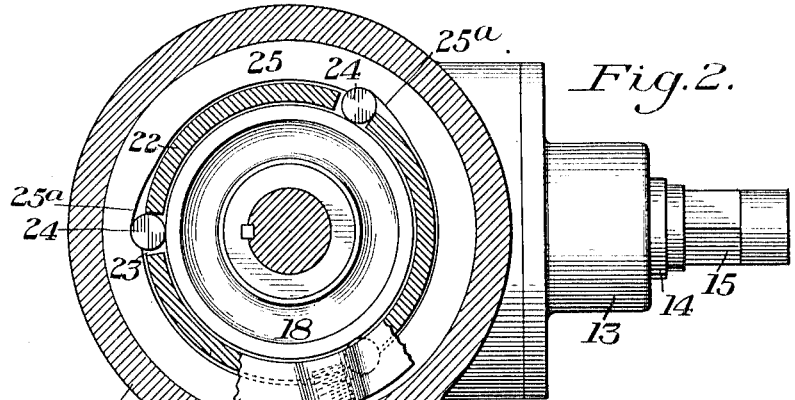
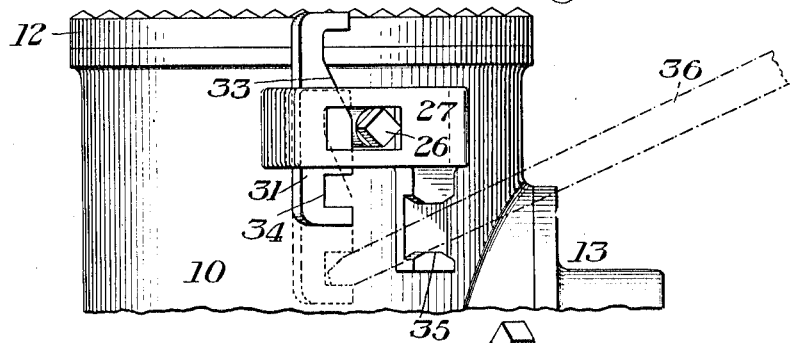
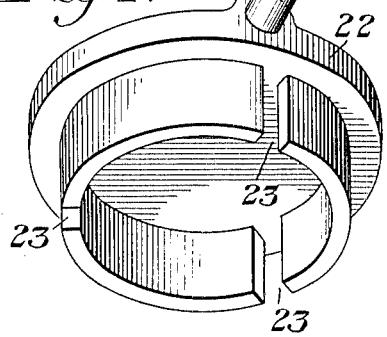
WITNESSES
INVENTOR

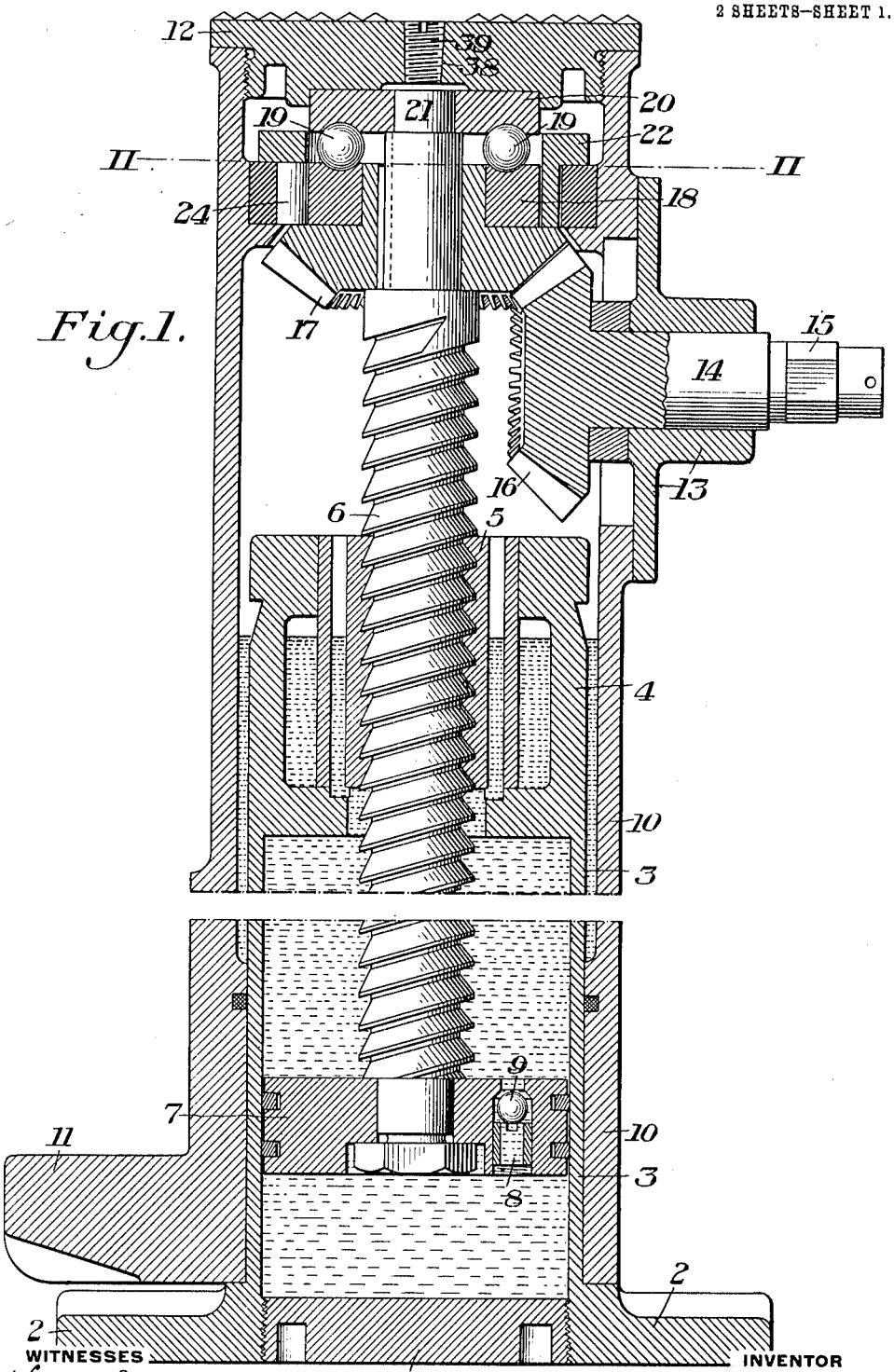

UNITED STATES PATENT OFFICE.

ISAIAH E. HINDMAN, OF CRAFTON, PENNSYLVANIA, ASSIGNOR TO THE DUFF MANUFACTURING COMPANY, OF PITTSBURGH, PENNSYLVANIA, A CORPORATION OF PENNSYLVANIA.

FRICTION-CLUTCH DEVICE.

1,089,703.

Specification of Letters Patent.

Patented Mar. 10, 1914.

Application filed May 7, 1912. Serial No. 695,729.

*To all whom it may concern:*

Be it known that I, ISAIAH E. HINDMAN, a resident of Crafton, in the county of Allegheny and State of Pennsylvania, have invented a new and useful Improvement in Friction-Clutch Devices, of which the following is a full, clear, and exact description, reference being had to the accompanying drawings, forming part of this specification, in which—

Figure 1 is a vertical section showing a preferred form of my invention as applied to a screw jack. Fig. 2 is a cross-section on the line II—II of Fig. 1. Fig. 3 is a partial side elevation showing a controlling device. Fig. 4 is a perspective view of the controlling ring. Fig. 5 is a detail of one of the clutch rollers, and Fig. 6 is a vertical section on the line VI—VI of Fig. 2.

My invention relates to friction clutch devices especially applicable to high speed screw jacks wherein the angle of the screw is sharper than the angle of repose; so that if released the load would rapidly lower the jack. It has been well-known that such types of jack were highly efficient owing to the high efficiency of quick pitch screw threads; but many difficulties have presented themselves in obtaining a proper mechanical device for holding the load while raising, and yet allowing lowering when desired. My invention is designed to overcome these difficulties and provide a mechanical clutch device which will hold the load during lifting and allow it to be lowered as desired; and which shall give safety, shall be comparatively simple, highly efficient, and will prevent sinking back when the raising is stopped.

In carrying out my invention I provide a controlling ring co-acting with anti-friction elements which are biased toward clutching position. The act of rotation in raising is arranged to coact with the controlling ring in such a way that the anti-friction devices will not retard or oppose this movement; but will immediately engage as a clutch and prevent backward movement as soon as the raising rotation is stopped.

In the drawings, 2 represents the base of the jack having an upwardly projecting cylinder 3 provided with a head 4 having a central nut 5. The quick pitch screw stem 6 extends down through the nut and has rotary engagement with the piston 7 which is provided with a by-pass 8 extending through it and controlled by an upwardly seating ball valve 9.

Surrounding the cylinder 3 is the lifting shell 10 which may have a foot-lift 11 at one side thereof, and carries at its top the lifting plate 12. Extending through a bearing 13 in the side of the shell is an operating stud shaft 14 having a squared outer end 15 and carrying within the shell a bevel gear 16 intermeshing with horizontal bevel gear 17, which is keyed to the threaded shaft 6. Surrounding the stem of the bevel gear 17 is a steel friction ring and ball race 18, having an annular groove in its upper face to receive a row of balls 19 which are also received by a corresponding annular groove in the upper ball bearing plate 20. This ball bearing plate 20 is centered by a reduced extension 21 on the elevating screw.

Outside the friction ring 18, I place the controller 22, preferably of the silent cam clutch type, which is split at an odd number of points, as shown at 23, to receive rollers 24. These rollers are of greater diameter than the thickness of the ring and engage the friction ring 18 within them and curved cam faces 25ª outside them and formed on the inner surface of a cam ring 25 which is forced into the upper part of the shell with a press fit. There are, of course, as many cam surfaces 25ª as there are rollers or anti-friction elements, 24, and the cam faces are so positioned relative to the screw thread of the elevating screw that during lifting the friction of rotation tends to carry the anti-friction elements into released position at the deepest part of the cam grooves.

In order to cause the rollers or anti-friction clutch devices to stop backward movement and hold the load in any position to which it is raised, some kind of biasing device is necessary which will constantly tend to move the parts into clutching position. In the form shown, I accomplish this by providing a stem or pin 26 which is secured to the upper enlarged diameter portion of the controller ring 22, and projects outwardly through the shell. On this shell, I form a small casing 27, preferably by casting it integral with the casing, which contains a spring 28 surrounding the stem 29 of a bearing block 30 fitting the side of the pin 26. The spring has a constant tendency to turn the controller ring in a clockwise direction, looking at Fig. 2, and hence to force the rollers into clutching position. This will not cause the rollers to oppose the rotation in lifting, but will cause the rollers to constantly follow up the lifting movement and always be ready to engage and check any backward movement. In actual practice, it is found that no settling back can be discerned when the lifting is stopped. This feature is of great importance, because such jacks are usually operated with a ratchet lift and if a certain amount of lift is lost at each stroke, this means a large reduction in efficiency.

The controller ring and clutch device which I have just described may be used to advantage with any rapid action screw jack having a screw of such a pitch that the load will lower itself and the jack unless backward movement is stopped.

In my jack in order to lower, it is only necessary to apply power to the shaft 14 in the reverse direction from that of lifting, which power will break the friction connection between the bevel gear 17 and its surrounding friction ring 18, thus allowing the rotation in the opposite direction and gradually lowering as desired. The parts are so designed that the friction between the bevel gear and its friction ring can never be overcome by any load within the range of the jack, thus preventing any accidental dropping of the jack under the load.

The parts above described, afford a complete screw jack since I thereby provide for lifting, prevent all backward movement when the lifting is stopped and have lowering under control. In order to further provide, however, for regulating the lowering of the load without turning of the actuating gear, I have shown the jack as provided with a fluid dash pot device and a knock-off device which completely releases the clutch device and allows the load to descend by leakage of the oil or other liquid in the dash pot. It will be understood, however, that the parts which I will now describe need not be used with the invention covered herein. In using these further features, I fill the cylinder and bore of the casing with oil up to about the level shown in Fig. 1, which oil must be forced around the piston and past its packing rings in order to allow descent of the shell. This regulates the speed of descent. In order to allow the load to thus force the shell downwardly, I provide a knock-off device for the clutch or controller ring. In the form shown this coacts with the biasing device. It consists of a vertically movable wedge 31 having a wedge face 32, a straight face 33, and an engagement slot 34. This wedge slides within suitable slots in the casing 27 and the shell is provided with a suitable fulcrum or rest 35 to receive a lever indicated in dotted lines at 36, which may be engaged with the wedge.

When it is desired to allow the load to move down under the fluid control, the wedge is forced upwardly into the position shown in full lines in Fig. 3. This turns the controller ring to a position where the rollers are at the deepest parts of the cam grooves and out of action and holds them in this position. In this case the friction ring will revolve as a part of the bevel wheel 17 and the load will push down the shell as rapidly as the transfer of the fluid from the lower to the upper side of the piston will permit. In such form the fluid will pass freely from above the piston to below the piston during lifting since the ball valve in the piston head will drop in its seat.

It will be noted that the base is provided with a central hole filled with a screw plug 37 in the form shown, thus providing for proper machining of the inner surface of the cylinder. Where oil is used, this is preferably filled in through a hole 38 in the top plate 12 which is closed with the screw plug 39.

The advantages of my invention will be obvious to those skilled in the art. Provision is made for the use of a rapid pitch screw jack without the settling back or sliding backward movement of the load at each stroke during lifting. The clutching action is distributed substantially equidistant around the screw, thus avoiding uneven wear and tendency to canting. The biasing device retains the clutch members in position ready to engage the moment that lifting is stopped. At the same time, the load may be lowered as desired by reversed power applied to the actuating shaft. The device gives safety, and efficiency, and is not liable to get out of order.

It will be understood that I am not claiming in this application the knock-off and dash pot arrangement, as this is claimed in my Patent No. 1,054,413, dated Feb. 25, 1913.

The invention herein claimed may be used with or without such additional parts or other added features, as it may be desired.

The form of clutch may be varied, the means for biasing the same may be changed, and other changes may be made without departing from my invention.

I claim:

1. The combination with a rotary member, of a friction ring coacting with the rotary member, a controller element around the ring, antifriction elements coacting with the controller element, an element having a series of cam surfaces to coact with the antifriction elements, and a biasing device, substantially as described.

2. The combination with a rotary member, a friction ring, a cam clutch coacting therewith, and a spring-actuated biasing device exerting a constant tendency on the cam clutch to move it into clutching position, substantially as described.

3. The combination with a rotary member, of a friction ring, a controller ring surrounding it, antifriction devices carried by the controller ring, a surrounding element having cam grooves coacting with the rollers, and a biasing device engaging the controller ring, substantially as described.

4. The combination with a rotary member, of a friction ring coacting with the said member, a controller element around the ring, antifriction elements coacting with the controller element, an element having a series of cam surfaces to coact with the antifriction element, a biasing device, and a knock-off for the biasing device, substantially as described.

5. In a device of the character described, the combination of a rotary member having a gear attached thereto, a friction ring carried by the gear, an upper bearing plate, a series of balls between the upper bearing plate and friction ring, a controller element surrounding the friction ring, and having vertical slots therein, rollers journaled in said slots, and adapted to contact with the friction ring, and a cam element surrounding the controller and having cam surfaces also engaged by said rollers, substantially as described.

6. In a device of the character described, the combination of a rotary member having a gear attached thereto, a friction ring carried by the gear, an upper bearing plate, a series of balls between the upper bearing plate and friction ring, a controller element surrounding the friction ring, and having vertical slots therein, rollers journaled in said slots and adapted to contact with the friction ring, and a cam element surrounding the controller and having cam surfaces also engaged by said rollers, together with a biasing device connected to the controller ring, substantially as described.

7. In a device of the character described, the combination of a rotary member having a gear attached thereto, a friction ring carried by the gear, an upper bearing plate, a series of balls between the upper bearing plate and friction ring, a controller element surrounding the friction ring and having vertical slots therein, rollers journaled in said slots and adapted to contact with the friction element, a cam element surrounding the controller and having cam surfaces also engaged by said rollers, together with a biasing device connected to the controller ring, and a knock-off device for the clutch or controller ring, substantially as described.

8. In a device of the character described, the combination of a rotary member, a friction ring carried thereby, a controller element around the ring, antifriction clutch elements coacting with the controller element, a cam member surrounding the controller element and acting upon the friction elements, a biasing device for normally holding the controller in one position, and a knock-off device for overcoming the action of the biasing device, substantially as described.

9. A friction clutch device comprising a friction ring, a rotary member to which the ring is attached, a controller element around the ring, anti-friction elements co-acting with the controller element, and another element having a series of cam surfaces to coact with the antifriction elements; substantially as described.

In testimony whereof, I have hereunto set my hand.

ISAIAH E. HINDMAN.

Witnesses:
 Geo. B. Bleming,
 C. P. Byrnes.